US012698989B2

(12) United States Patent
Cambou et al.

(10) Patent No.: US 12,698,989 B2
(45) Date of Patent: Aug. 4, 2026

(54) ENHANCING SYSTEM RESILIENCE WITH DIFFERENTIAL, SENSOR-BASED PUFs

(71) Applicant: Arizona Board of Regents on Behalf of Northern Arizona University, Flagstaff, AZ (US)

(72) Inventors: Bertrand F. Cambou, Flagstaff, AZ (US); Julie B. Heynssens, Flagstaff, AZ (US); Donald Telesca, Rome, NY (US); H. Shelton Jacinto, Rome, NY (US)

(73) Assignees: Arizona Board of Regents on Behalf of Northern Arizona University, Flagstaff, AZ (US); UNIVERSITY GOVERNMENT OF THE UNITED STATES AS REPRESENTED BY THE SECRETARY OE THE AIR FORCE, Albuquerque, NM (US)

( * ) Notice: Subject to any disclaimer, the term of this patent is extended or adjusted under 35 U.S.C. 154(b) by 453 days.

(21) Appl. No.: 18/144,104

(22) Filed: May 5, 2023

(65) Prior Publication Data

US 2023/0358579 A1 Nov. 9, 2023

Related U.S. Application Data

(60) Provisional application No. 63/338,731, filed on May 5, 2022.

(51) Int. Cl.
| | |
|---|---|
| *G01D 18/00* | (2006.01) |
| *G01D 3/02* | (2006.01) |
| *G01D 5/244* | (2006.01) |

(52) U.S. Cl.
CPC ............. *G01D 18/00* (2013.01); *G01D 3/022* (2013.01); *G01D 5/24461* (2013.01); *G01D 18/008* (2013.01)

(58) Field of Classification Search
CPC ...... G01D 18/00; G01D 18/008; G01D 3/022; G01D 5/24461
See application file for complete search history.

(56) References Cited

U.S. PATENT DOCUMENTS

| | | | |
|---|---|---|---|
| 5,479,161 | A | 12/1995 | Keyes et al. |
| 6,019,086 | A | 2/2000 | Schneider et al. |
| 6,029,524 | A | 2/2000 | Klauder et al. |
| 8,031,045 | B1 | 10/2011 | Tsvey |
| 8,498,827 | B2 | 7/2013 | Yost |
| 9,151,809 | B2 | 10/2015 | Astegher et al. |
| 9,683,906 | B2 | 6/2017 | Giebibl |
| 11,303,460 | B2 | 4/2022 | Cambou |
| 2003/0111058 | A1 | 6/2003 | Mathews |
| 2006/0178857 | A1 | 8/2006 | Barajas |
| 2008/0161664 | A1 | 7/2008 | Mastrototaro et al. |

(Continued)

*Primary Examiner* — Christian T Bryant
(74) *Attorney, Agent, or Firm* — Quarles & Brady LLP

(57) ABSTRACT

A resilient sensor system is disclosed for use on a device requiring sensor data. The system includes a calibrated and an uncalibrated sensor arranged to sense the same environmental stimulus. During enrollment, the raw sensor output from both sensors is differenced over a range of sensor input to build an unclonable fingerprint of the sensor pair. This fingerprint is checked against a contemporaneously generated fingerprint to ensure continued fidelity of the calibrated sensor.

12 Claims, 9 Drawing Sheets

(56)        References Cited

U.S. PATENT DOCUMENTS

| | | | |
|---|---|---|---|
| 2008/0276155 A1 | 11/2008 | Shim et al. | |
| 2010/0127822 A1* | 5/2010 | Devadas | H04L 9/3278 |
| | | | 726/2 |
| 2010/0229975 A1 | 9/2010 | Sweeney et al. | |
| 2012/0221168 A1 | 8/2012 | Zeng et al. | |
| 2013/0293217 A1 | 11/2013 | Moiseev et al. | |
| 2015/0195088 A1* | 7/2015 | Rostami | H04L 9/3278 |
| | | | 380/28 |
| 2017/0230188 A1* | 8/2017 | Voutilainen | G09C 1/00 |
| 2018/0006830 A1* | 1/2018 | Cambou | G06F 21/44 |
| 2019/0312740 A1* | 10/2019 | Cambou | H04W 12/06 |
| 2022/0085817 A1* | 3/2022 | Ji | G11C 29/50 |

* cited by examiner

| 1A (1st sensor) | 1B (1st ref.) | 2B (2nd ref.) | 2A (2nd sensor) | Output | Testing? | Operating Mode (If test positive) |
|---|---|---|---|---|---|---|
| No | No | - | - | 2A/2B | Test: 2nd pair | 2nd pair |
| No | - | No | - | 2A/1B | Test: 2nd sensor & 1st reference | 2nd sensor & 1st reference |
| No | - | - | No | 1A/1B | Test: two references (compute) | Two references |
| - | No | No | - | 1A/2A | Test: match two sensors | Two sensors |
| - | No | - | No | 1A/2B | Test: 1st sensor & 2nd reference | 1st sensor & 2nd reference |
| - | - | No | No | 1A/1B | Test: 1st Pair | 1st Pair |

FIG. 4

ENHANCING SYSTEM RESILIENCE WITH DIFFERENTIAL, SENSOR-BASED PUFs

The present application claims priority from and benefit of U.S. Provisional Patent Application No. 63/338,731 filed on May 5, 2022. The disclosure of the above-identified patent application is incorporated by reference herein in its entirety.

FIELD OF THE INVENTION

The present invention generally relates to sensor systems and more specifically to creating resilient sensors capable of detecting sensor failures and/or malicious attacks on sensing systems. The systems disclosed herein generally rely on the use of sensors as physically unclonable functions (PUFs).

BACKGROUND

Sensors convert physical and/or chemical signals into electric signals driving microelectronic systems. Sensors, generally, are configured to produce an electric signal that convey accurate information about the physical or chemical stimulus applied to the sensor. That is, the goal of a sensor system is to create a signal that accurately reflects an input chemical or physical stimulus or condition that exists in the real world (e.g., light, heat, acceleration, magnetic field strength, or the like). In order to generate electric signals that accurately represent the physical or chemical signals, calibration techniques are used to compensate for the natural variations which are created during the manufacturing of the sensors. Calibration is the process of modifying raw electrical sensor output signals such that those signals accurately reflect the objective reality of the physical or chemical input signal. For example, if a sensor is an optical sensor, a calibration process may be applied to the raw electrical output of the sensor so that a calibrated signal or value is generated that accurately represents an input stimulus (e.g., the amount of light actually incident on the sensor).

Sensors are increasingly used in a variety of systems, and the accuracy of those sensors is increasingly vital to the proper and safe operation of those systems. In particular, with the emergence of artificial intelligence, robots, and autonomous vehicles, sensor failures can have catastrophic impacts. Decisions based on bad information received from arrays of sensors are difficult if not impossible to correct. Sensor failures can be due to errors or damage in the sensors themselves, or they may be forced failures due to cyberattacks.

Conventionally, the risks of sensor failure are mitigated by providing redundant sensors as part of sensor clusters. These conventional solutions have certain drawbacks. For example, sorting out the reliable sensors from the faulty ones can be difficult. The management of the discrepancies between the measurements collected from each sensor is not always straight forward. Additionally, clusters of sensors can be impacted by the same problem, such as damage affecting a portion of an autonomous vehicle. Spatially spreading out the sensors may result in the sensors not measuring the same physical values. Additionally, Real-time analysis of redundant elements can be challenging. It is always quicker to use a single sensor rather than an array of sensors that require complex analysis. This analysis can necessitate parallel interface ports and concurrent processing, thereby making the system more complex, and vulnerable to new failures. Also, the cost of redundancy can be prohibitive for some applications. In addition to an increase in the bill of material, redundancy can also consume significant computing power forcing the selection of more expensive processors.

It would be desirable to have systems and methods for improving sensor reliability in sensor-dependent systems that overcome these disadvantages.

SUMMARY OF THE INVENTION

Certain inventive embodiments overcome the aforementioned weaknesses associated with conventional sensor systems through the use of differential sensor-based physical unclonable functions (PUFs). These PUFs combine a sensor that is calibrated, and a second uncalibrated sensor. Both sensors are, in certain embodiments, exposed to the same physical or chemical stimulus. Because the calibrated sensor has been calibrated, its output will accurately reflect the physical or chemical input stimulus. The output of the uncalibrated sensor will reflect that sensor's own uniqueness that depends on natural variations in manufacturing. The differences between these two sensors, which will be referred to herein as responses, are measured initially during an enrollment cycle. In this enrollment process, the calibrated sensor and the uncalibrated sensor are exposed to the same physical, chemical or other environmental conditions, under a variety of magnitudes, and the differences between the calibrated and uncalibrated sensor output at each input level is measured and stored in a database. By way of example, the light level on a pair of photodetectors, one calibrated and one uncalibrated, may be ramped and the differences between the calibrated detector and the uncalibrated detector at various input light levels is measured/calculated and recorded. The physical or chemical input may be thought of as a "challenge" to the sensor pair, and the differential response is the response. Because one sensor is calibrated, that sensor's output directly reflects the input stimulus or the "challenge".

In alternative embodiments, the response is the differential output between two sensors, prior to any calibration. In these embodiments, entropy is increased because the response reflects unpredictable physical variations inherent in both sensors, and the response encodes less information about the stimulus used to elicit the response.

Referring still to an example arrangement, measured challenge-response-pairs (CRPs) are kept as references in a look-up table by a controlling server. Sensors systems according to inventive embodiments are used on devices that require the gathering and use of accurate sensor data about real world conditions (e.g., autonomous vehicles). Such devices include computing devices including programmable processors and memory encoding computer readable execution that direct the processing and use of sensor data according to the implementations below. During normal operation of a device including a sensor PUF implemented according to the disclosure, the PUF sends to the programmable processor or a controlling server both the challenges, which are the calibrated outputs, and the responses, which are a series of the differential output readings between the two sensors. A mis-match between the responses stored in the look-up table for a given challenge value, and ones generated by the differential elements stored in the lookup table for that challenge value indicates a malfunction or an attack on the sensors and compromises the trust in the sensor.

In certain embodiments, a second differential sensor-based PUF is located at a distance from the first one. Preferably a first pair of sensors is located in a unitary device (e.g., a system on a chip), while the second pair of sensors is located in a second unitary device (e.g., a second system on a chip), physically separated from the first unitary device. By physically locating the second differential sensor PUF a distance away from the first PUF, the hope is that a cause of a sensor malfunction acting on the first pair of sensors will not also be acting on the second pair of sensors. For example, consider a LIDAR distance sensor on an autonomous vehicle. One pair of LIDAR sensors (one calibrated and one uncalibrated) may act as a first PUF and be located at a first location on the vehicle, and a second pair of sensors (one calibrated and one uncalibrated) may be located at a second position on the vehicle. If the first pair is damaged by collision with some object, the second pair will likely remain undamaged. This second sensor pair PUF may also be used by a controlling server to detect sensor failure.

Systems operating according to inventive embodiments have certain advantages when compared to the conventional use of redundant sensors. For example, in systems using several redundant sensors, the systems and methods described herein can detect regular failures as well as cyberattacks. Additionally, by optionally using a redundant PUF (sensor pair) in a different location than the first one, the system can overcome a local problem that would otherwise compromise collocated redundant PUFs. Additionally, inventive embodiments are simpler to operate as there is no need to involve the redundant PUF under normal operation. Additionally, embodying systems are cheaper to build, because there are only two sensors to calibrate.

In this disclosure several methods are used to exploit the natural physical variations of sensors, to generate cryptographic physically unclonable functions (PUF) that are aimed at strengthening the cybersecurity of microelectronic systems.

The above features and advantages of the present invention will be better understood from the following detailed description taken in conjunction with the accompanying drawings.

BRIEF DESCRIPTION OF THE DRAWINGS

FIG. 4 is chart summarizing a failure analysis and reconfiguration process for the sensor arrangement of FIG. 3;

DETAILED DESCRIPTION

Figure 1:
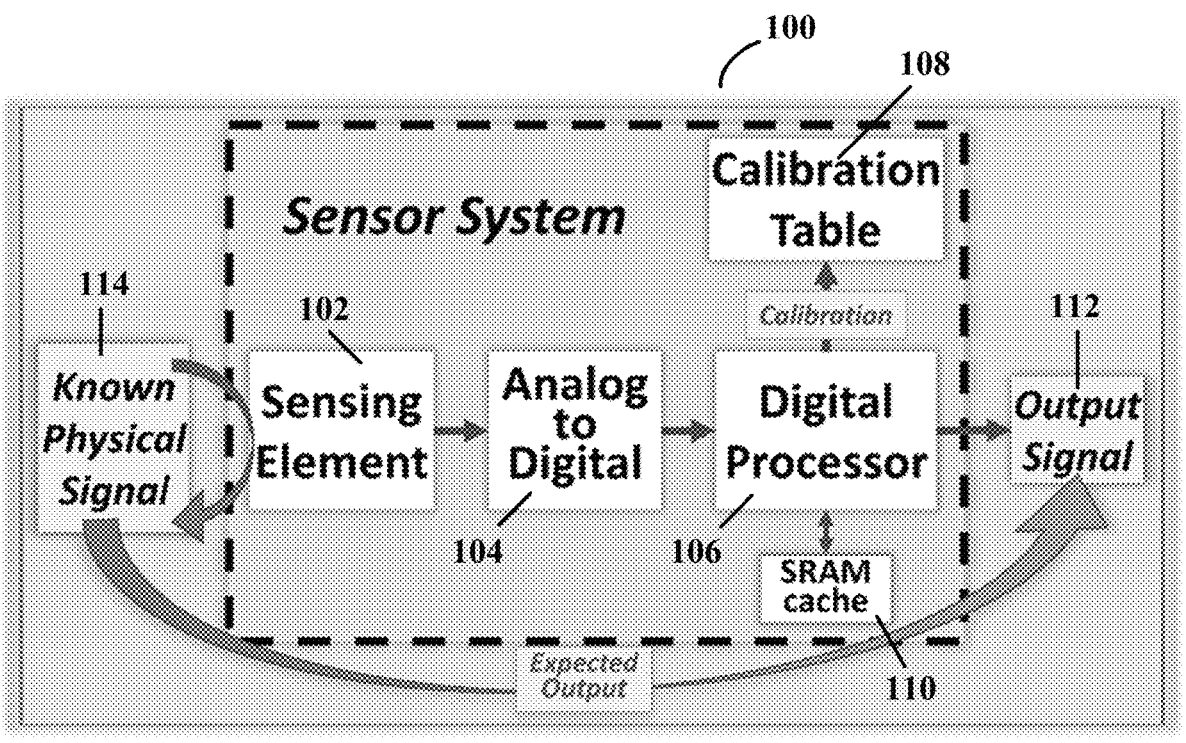
FIG. 1 is a block diagram of a sensor system.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Sensor devices are increasingly integrated into electronic systems such as mobile devices, Internet of things (IoT), cyber physical systems (CPS), smart grid, medical devices, safety components, robots, and autonomous and semi-autonomous vehicles. Sensors, generally, convert physical stimulus into electronic signals that directly convey accurate information about the physical stimulus and enable accurate conclusions about the type and quantity of the physical stimulus being sensed by the sensor. The range of physical and chemical parameters that may be converted into usable electronic signals is extremely broad, and includes voltage, current, radiance, irradiance, intensity, acceleration, rotation, deviation to the magnetic north, electronic currents, motion, image, chemical and biochemical elements, blood composition, heart beat rate, temperature, pressure, mechanical stress, humidity, and many others. The range of sensors usable with the inventive embodiments described below includes optical sensors (e.g., CCDs, photodiodes and photodiode arrays, thermistors, photocouplers), electrical sensors (voltage sensors, current sensors, resistance meters, capacitance meters, inductance meters), accelerometers, thermometers, magnetic sensors (e.g., magnetic field sensors, Hall effect devices, gaussmeters), acoustic sensors, lidar sensors, radar sensors, wind speed sensors, altimeters, speedometers, tachometers, pressure sensors and barometers, and GPS receivers.

Due to manufacturing variations, the sensing elements of two given individual sensors of the same type will generally have a different response even if the sensors were fabricated using the same process and according to the same specifications. For example, two CCD elements (i.e., individual pixels) fabricated by the same methods and according to the same specifications will generally have different electrical outputs when the same amount of light of the same wavelength is incident upon both sensors under the same conditions. In order to account for these differences, sensors are calibrated to ensure the off-the-shelf uniformity of sensor performance. One method of calibration involves performing preliminary calibration of a sensor during manufacture of the sensor and storing associated calibration data in a calibration table in a memory accessible by a programmable processor processing the sensor output signals. This calibration step is generally performed using a known reference source that produces a known physical stimulus on the sensor under calibration. For example, in the case of CCD arrays, the response of each detector element must be calibrated to ensure accuracy and uniformity of the CCD array. In these cases, a reference optical source is used to supply a known amount of uniform irradiance across the entire detector array, the electrical signal output of each pixel element is measured, and a scale factor is calculated for each element that, when applied to the measured output of each element, results in a calibrated output that is both uniform across the array and accurately reflects the input irradiance from the reference source. This array of scale factors is one example of calibration data. In operation of a device using the sensor, the calibration data is applied to the output signals of the sensor in order to standardize the sensor output signals (e.g., the sensor response) and to ensure the accuracy of the sensor. In this way, the manufacturing variations of individual sensors and their effects on the responses of these sensors are accounted for.

While the calibration data described in the foregoing example is described as a "scale factor", that is not limiting. Calibration data may be a scale factor, that is, a value that is multiplied with the value of the raw, uncalibrated output of the sensor element. In other cases, the raw value output by the sensor may be divided by the scale factor. In other cases, the calibration data may be an offset, i.e., a value that is added to or subtracted from the value reflecting raw, uncalibrated sensor outputs. In certain cases, the calibration data may be combinations of one or more of the foregoing. The calibration data may be applied in analog (e.g., through a programable amplifier) or to sensor output that has been digitized. In preferred and typical cases, the calibration data for each sensor element is stored in a table of multiple scale factors or offsets measured or computed for different levels of input stimulus. Such calibration data is useful because sensors rarely have linear responses, and so having different scale or offset values at different levels of physical stimulus is advantageous to make the calibrated values output by the sensor system linear with input stimulus. In other cases, a non-linear calibrated response is desirable (e.g., in an optical sensor mimicking the non-linear sensitivity of a human eye), and non-linear gain may be built into the calibration data table. In other cases, the calibration data is encoded in a function that relates the raw output of the sensor to a calibrated output. In still other cases, the calibration data may include parameters from which a calibration function may be computed.

The manufacturing variations that occur in sensors make sensors ideal candidates for use in physically unclonable function (PUF) based security and identification systems. A PUF is a physical entity that is relatively easy to make and evaluate, but that is highly impractical to duplicate due to its unpredictable but repeatable response to physical stimulus. In the case of sensors, the intrinsic randomness of the manufacturing variations of a given sensor can be used as the basis for a PUF. For example, in the case of a CCD array, each pixel device will have a responsivity curve (electrical output v. input irradiance) that is unique that device. Additionally, across the array, the relative responsivities of devices will be non-uniform (i.e., the responsivity curves of individual devices will be offset with respect to one another). The responsivity variability of devices in such an array is random, unpredictable, but stable and repeatable, making such devices highly suited for use as PUFs.

It will be appreciated that the calibration data stored in a calibration data will reflect the difference between the physical stimulus supplied to the sensor and the electrical signal reflecting the raw output of the sensor. Thus, the calibration table for a sensor takes on the intrinsic randomness of the manufacturing variations of the sensor. This allows the use of just the data stored in the calibration table to be used as PUF, since it is sort of a negative image of the PUF characteristics of the variations inherent in the sensor element itself. The use of the calibration table as a PUF allows for tasks like verification or PUF-based encryption to be performed without needing to actually apply a detectable stimulus (e.g., physical or chemical stimulus) to the sensor, which greatly simplifies PUF-based system verification over other methods that require a known detectable stimulus (e.g., physical or chemical stimulus) to be applied to the sensor being verified. In the embodiments described below, a previously stored set of differential sensor outputs (responses) to predetermined input stimulus (challenges) serves as a unique fingerprint for a sensor system. In operation, this fingerprint is periodically or continuously checked against a contemporaneously generated set of responses generated during sensor operation to ensure that the sensor system is still operating correctly.

Systems for verification and encryption using sensor-based PUFs have been designed using two sensors of the same type, one calibrated and the other uncalibrated, and differences between the outputs of the calibrated sensor and of the uncalibrated sensor may be compared (e.g., using exclusive-OR logic circuitry) to generate data that can be used as the basis for a PUF. This type of two-sensor system is referred to herein as a "differential sensor system." For differential sensor systems, a physical or chemical signal does need to be applied to the sensors during PUF-based verification. However, the physical or chemical stimulus applied during PUF-based verification of the differential sensor system does not have to be a known quantity, which is advantageous over alternative methods of PUF-based verification that require a known physical or chemical stimulus to be applied to the sensor being verified. Such systems are described in U.S. Pat. No. 11,303,460 (application Ser. No. 15/635,822) entitled "PUFs from sensors and their calibration", which published on Apr. 12, 2002, the entirety of the disclosure of which is incorporated herein by reference.

FIG. 1 shows a sensor system 100 that is usable in connection with the inventive embodiments described below. The system 100 of FIG. 1 includes a sensor 102, an analog-to-digital converter (ADC) 104, a digital processor 106 having an output 112, a static random access memory (SRAM) cache 110, and a calibration table 108. A signal source 114 is coupled to the sensor system 100 at an input of the sensor 102. During calibration, the signal source 114 produces a known reference input stimulus to the sensor (e.g., a known voltage, current, irradiance, acceleration, etc.). During normal sensor operation, the signal source 114 is whatever physical or chemical phenomenon the sensor 100 is intended to measure. The input stimulus is a detectable (e.g., physical or chemical) signal that is sensed by the sensor 102. The sensor 102 generates an electrical analog signal corresponding to the detectable input stimulus signal. This raw analog output is optionally provided to an ADC 104. The ADC 104 converts the analog signal generated by the sensor 102 into a digital signal, which is provided to the digital processor 106. The digital processor 106 then provides the digital signal to an external system through output 112. The SRAM cache 110 includes multiple flip-flop based cells and may be used to reduce the average cost of accessing data in non-volatile memory of the sensor system 100 by the digital processor 106. For example, the SRAM cache 110 may store copies of data from frequently used locations in the non-volatile memory.

Sensor systems such as the sensor system 100 need to be calibrated with known detectable (e.g., physical or chemical) signals that produce known (i.e., expected) electrical signals when processed by a sensor such as the sensor 102. Possible calibrations may include determining a reset position (i.e., obtaining a zero as an output signal when no detectable signal parameter is sensed) to correct deviations for accurate reading, and to enhance the linearity of the electric signal. Other corrections that may be part of the calibration process include adjusting temperature coefficients, biasing conditions, and cancelling background noise. The calibration table 108 stored in a non-volatile memory may contain calibration data that is applied to the analog signal at the ADC 104 in order to calibrate the analog signal. Calibration may include the scaling, offsetting or application of a function to raw digital or analog electrical output signals from a sensor in order to produce calibrate signals that accurately reflect, represent, or permit justified conclusions to be drawn about the nature and quantity of the physical or chemical input stimulus that has been applied to the sensor. In other words, the calibration data is data that is applied to or used to process raw sensor output to generate calibrated sensor output that accurately reflects or is usable to draw accurate conclusions about the real-world phenomenon being sensed by the sensor.

Figure 2:
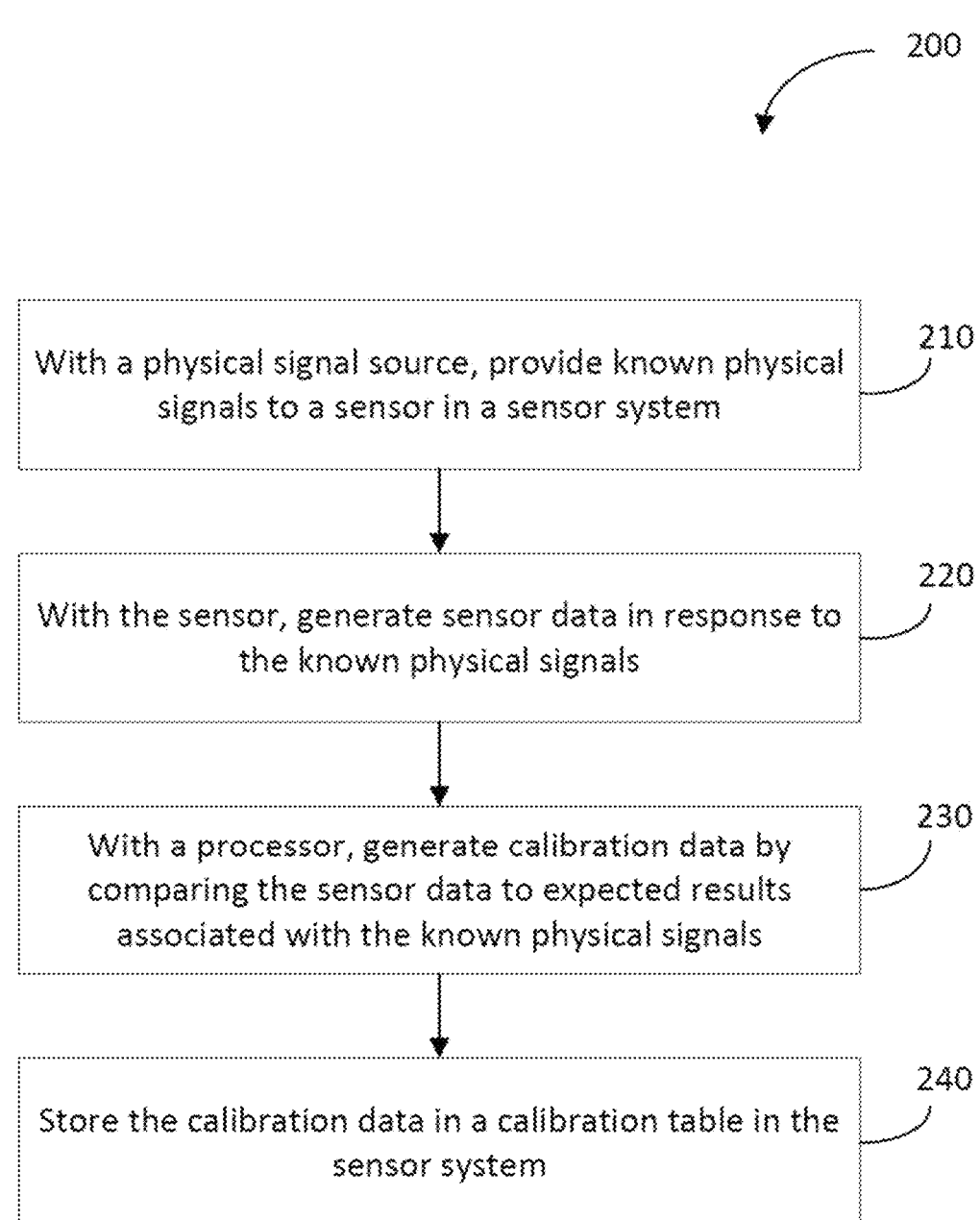
FIG. 2 illustrates a method of calibration of a sensor system.

An illustrative method 200 for populating a calibration table in a sensor system, such as the calibration table 108 in system 100, is shown in FIG. 2. At 210, a signal source (i.e., a reference) provides known detectable (e.g., physical or chemical) stimulus to a sensor in a sensor system. This known detectable stimulus may be considered a known detectable input signal. When these known detectable signals are processed by an ideal sensor, the ideal sensor may generate expected results that are known to accurately correspond to or reflect the known detectable signals. These expected results are used as a basis for calibration of the sensor in the sensor system, which is assumed to be non-ideal. In other words, calibration data stored in the calibration data will be data usable to apply to the uncalibrated sensor output to change that output into calibrated output that would be expected from an ideal sensor and would directly and accurately reflect the input signal.

At 220, the sensor generates sensor data in response to the known detectable signals. The sensor data may be generated in the form of analog signals, which may be subsequently converted to digital signals for processing.

At 230, a processor generates calibration data by comparing the sensor data to the expected results associated with the known detectable signals. The processor may be a digital processor in the sensor system or, if desired, may be external to the sensor system. The calibration data is a set of data that, when applied to the sensor data output by the non-ideal sensor, produces an expected result (i.e., a result that accurately and directly reflects the input signal or the physical phenomenon being measured by the sensor) for a given detectable (e.g., physical or chemical) signal input of the sensor system. In some instances, the calibration data may only produce an approximation of the expected result for the given detectable signal due to limitations on the size of the calibration data or on the processing power/speed required to perform adjustments using the calibration data.

At 240, the calibration data is stored in a calibration table in non-volatile memory of the sensor system. The calibration data stored in the calibration table may be, for example, a bit stream, which may be logically combined (e.g., using the logic functions AND, OR, NOR, NAND, XOR, etc.) with the sensor data in order to produce expected results or approximations of expected results for one or more detectable (e.g., physical or chemical) signals received by the sensor system. In alternative embodiments, the calibration data may be used to direct analog scaling of the raw sensor output prior to digitization.

Figure 9:
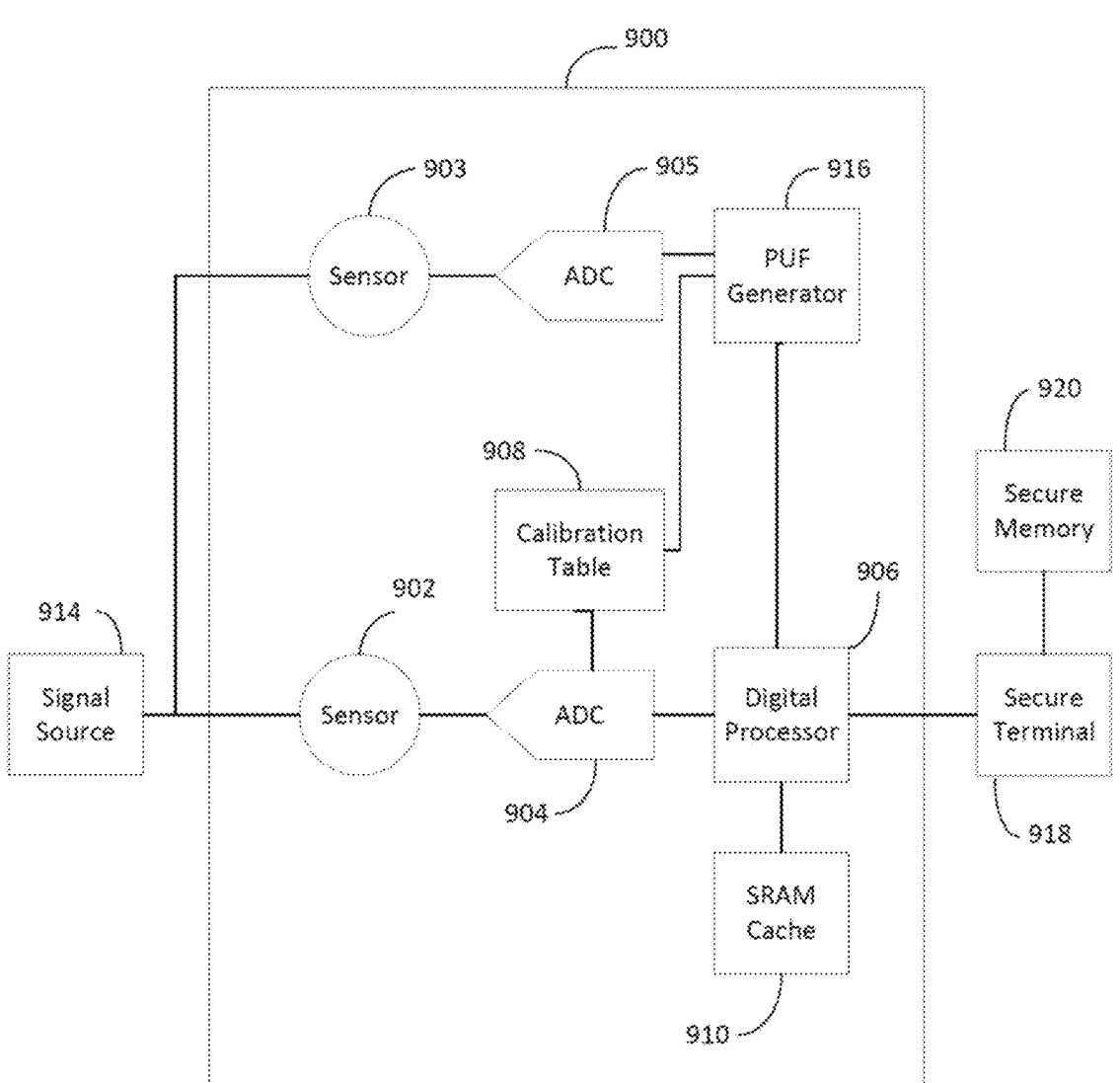
FIG. 9 is a block diagram of an illustrative sensor system with a differential sensor-based PUF generator.

FIG. 9 schematically illustrates an arrangement for building CRPs using a differential sensor system including one calibrated and one uncalibrated sensor. FIG. 9 shows a differential sensor system 900 that can be authenticated using PUF CRPs generated from two differential sensors. Sensor system 900 includes a calibrated sensor 902, an uncalibrated sensor 903, an ADC 904, an ADC 905, a programmable digital processor 906, a calibration table 908 for the calibrated sensor 902, a SRAM cache 910, and a PUF generator 916. If desired, the ADC 904 and the ADC 905 may be combined into a single ADC unit. Secure terminal 918 is connected to differential sensor system 900 and to a secure memory 920. While secure terminal 918 is shown here as being separate from secure memory 920, it should be noted that secure memory 920 may be implemented as part of secure terminal 918 if desired.

The sensors 902 and 903 each receive and process the same detectable (e.g., physical or chemical) signals from a signal source 914. Because the sensor 902 is calibrated using the calibration table 908 and the sensor 903 is uncalibrated, the digital sensor signal that is output by the ADC 905 will generally be different from the digital sensor signal output by the ADC 904, at least in instances in which the calibrated sensor signal is different from the uncalibrated sensor signal. The difference between the calibrated digital sensor signal and the uncalibrated digital sensor signal may be represented as a hamming distance, which measures the excursion of the uncalibrated digital sensor signal from the calibrated digital sensor signal.

The PUF verification of system 900 may be defined using streams of binary bits. If the stream resulting from the calibrated sensor 902 is "B":

$$B=\{b_1, b_2, \ldots, b_i, \ldots, b_n\}$$

If the stream resulting from the uncalibrated sensor is "I":

$$I=\{i_1, i_2, \ldots, i_i, \ldots, i_n\}$$

The PUF response is given by:

$$R=B\oplus I=\{r_1, r_2, \ldots, r_i, \ldots, r_n\}$$

With $\oplus$ being the logical exclusive OR (XOR) function and for $i\epsilon\{1 \text{ to } n\}$:

$$r_i=b_i\oplus i_i$$

The PUF response R (the difference in the output of the calibrated and uncalibrated sensors) may then be compared with the challenge C stored in the secure terminal. C is generated during an initial set up in the same way R is generated and is stored in a secure memory 920. That is to say, C may be generated by providing a range of known input stimulus to both sensors, and a range of corresponding differential sensor output is measured and stored as C. The authentication is positive when the response R (the contemporaneous differential measurement to a given input stimulus) and the challenge C (a previously measured differential measurement to the same given input stimulus) match. The match is positive when the hamming distance between R and C is small. The Hamming distance, or CRP errors, between C and R is the number of bits at "1" present in the resulting stream R⊕C. The PUF response R is calculated at the PUF generator 916, while the hamming distance is calculated at the secure terminal 918. The sensor system 900 is successfully authenticated when the rate of CRP matches meets or exceeds a predetermined rate.

Figure 3:
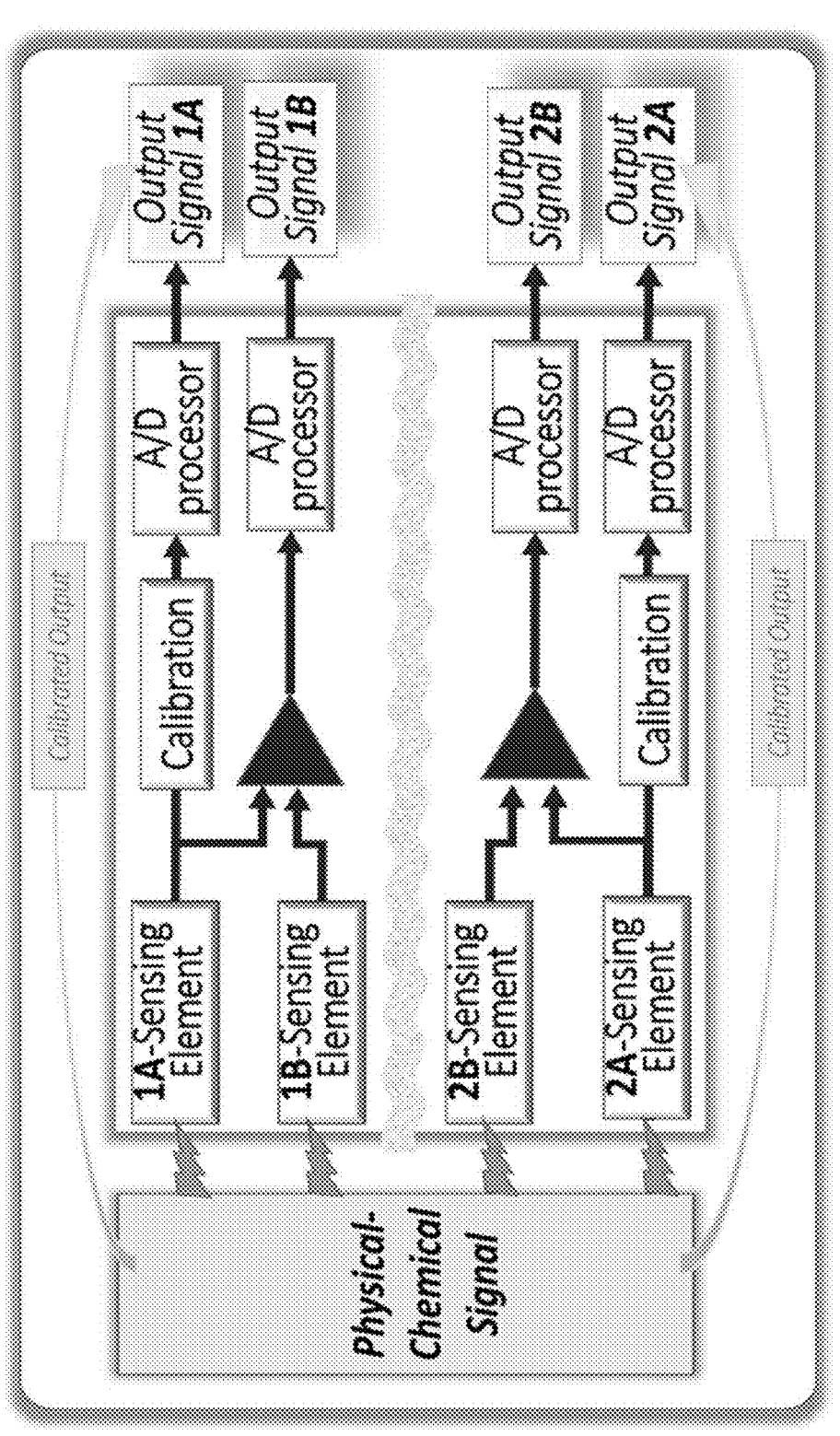
FIG. 3 is a block diagram that schematically illustrates an arrangement for using two pairs of sensor elements to generate CRPs.

FIG. 3 schematically illustrates a resilient sensor system based on measurements by pairs of sensors. In the arrangement of FIG. 3, there are two pairs of sensing elements, denoted "1" and "2". Each pair has a first sensor that is calibrated (1A and 2A). Here, calibration means that the raw analog or digital output of the sensor may be processed according to previously generated and stored calibration data that is stored in a calibration table, preferably in a secure memory on the same device as the sensor system of FIG. 3. This process will preferably be performed by a programmable processor in communication with the calibration table that may be located on the device using the sensor data, but may be located remotely. Thus an "uncalibrated" sensor may simply be a sensor that produces an output that is never subject to the calibration process, or at least, that generates a signal that is not subject to a calibration process prior to being differenced with the output signal of another sensor, as discussed below. The process of generating the calibration data is, for example, the process described above in reference to FIGS. 1 and 2. Each sensor pair also has a second pair of sensors (1B and 2B) that are acting as uncalibrated sensors (i.e., no calibration data has been generated for these sensors, or the signals are simply not subject to processing in accordance with any calibration data, at least prior to differencing). Within each pair, 1 and 2, the pair of sensors, A,B are preferably of the same sort and built to the same specifications.

In certain cases, each pair of sensors within a pair may be a portion of a unitary sensor array, for example, sensor 1A may be CCD pixels (or a single pixel) having a first range of addresses, and sensor 1B may be pixels (or a different single pixel) having a second range of addresses within the same array. Preferably the sensors between pairs are also of the same type and built to the same specifications, but this is not a requirement for all embodiments. Again, all sensors (1A, 1B, 2A, 2B) may be portions of the same sensor array in certain cases. In preferred cases, the first sensor pair is located on a unitary device (e.g., a system on a chip), while the second pair of sensors is located on a different unitary device (e.g., a system on a chip). In preferred cases, the second sensor pair is located on a device using sensor input (e.g., a vehicle) at a different position than the first sensor pair.

The sensing elements in FIG. 3 generate an analog electrical signal in response to some physical or chemical input stimulus. Thus, the sensing elements measure an incoming signal resulting from some physical or chemical parameter such as acceleration, rotation, magnetic field, electric current, chemical composition, pressure, light intensity, color, humidity or any other physical phenomenon described above.

The sensor arrangement of FIG. 3 produces a range of electric output signals, Output Signals 1A, 1B, 2A and 2B. These signals are preferably digital signals. Signal 1A is the calibrated output of sensor 1A, i.e., the raw analog output of 1A that has been processed according to calibration data such that it accurately reflects the input stimulus ("Physical-Chemical Signal) and digitized. The digitization step can occur before or after applying calibration data. Signal output 1B is produced by differencing (using a differential circuit) the raw (uncalibrated) outputs of sensors 1A and 1B. This differencing may be any operation that results in a signal reflecting a difference between the raw outputs of sensors 1A and 1B, including voltage subtraction (e.g., using a differential amplifier) where the raw outputs of 1A and 1B is a voltage signal. Other sorts of differencing are possible, such as differencing digital signals using a comparator to generate a differenced bit stream. The difference signal between 1A and 1B is then digitized to result in output signal 1B.

In the arrangement of FIG. 3, the outputs of sensors 1A and 1B are differenced prior to the 1A signal being calibrated, but this is not a requirement. In alternative arrangements, the calibrated 1A signal is differenced with the uncalibrated 1B signal. Again, this differencing may be done while the sensor signals are still analog signals, or may be done after digitization.

The sensor system output signal "1A" is the result of the calibrated measurement of the input signal applied to sensing element "1A", while output signal "1B" is the result of the differential read between sensing elements 1A and 1B. The second pair of sensors (2) is a redundant element sharing the exact same architecture. Both pairs can be integrated in a single device or placed at different locations in the system to enhance resilience against certain failures.

Where the two pairs are placed in different locations on an apparatus using the sensor data, the distance between the pairs will vary according to the physical or chemical parameter being measured and the type of environment a device using the sensors is operating in. The pairs should be placed sufficiently close together such that they are measuring the same input signal (which will be ensured by seeing a very small difference in the calibrated outputs of 1A and 2A in operation). If the sensors are lidar detectors on an autonomous vehicle, the pairs will likely need to be located relatively close to one another, e.g., within the range of a few inches, because lidar sensing is highly direction dependent. On the other hand, if the sensors are aircraft ground sensors, intended to sense distance to the ground, they may be located on opposite sides of an aircraft (e.g., tens of meters from one another) on opposite ends of a fuselage or on opposite but equal positions on the underside of wings.

The differential read between two sensors in a sensor pair acts as unique fingerprint for the sensor pair because it reflects the random manufacturing variations of both sensors, which are expressed in the variable responsivities of sensors as a function of input stimulus. In cases where the differential read is taken between the calibrated signal of a first sensor and an uncalibrated sensor of the second signal, the differential read serves a fingerprint encoding the variability of the uncalibrated sensor. In the arrangement of FIG. 3, the variations in both sensors are expressed in the differential read since the differencing is performed on the uncalibrated output of each sensing element. In certain embodiment, this fingerprint (the differential output) is recorded in advance, as a function of input stimulus (which is measured by the calibrated sensor output) and stored in a lookup table. During operation of the sensor, this fingerprint is continuously or periodically checked against a contemporaneous differential read measurement to ensure that the sensors in the pair are functioning property and are authentic and not subject to a cyberattack or spoofing attack. This process will now be described.

Prior to use, the arrangement of FIG. 3 is subjected to an enrollment process, similar to those described above. The arrangement used for each sensor pair during enrollment is the same as that shown in FIG. 3, and it preferably involves a calibrated and an uncalibrated sensor. During enrollment, the physical/chemical input signal is a reference signal, that is varied so that a range of inputs is suppled to each sensor pair. The calibrated sensor (1A or 2A) produces a calibrated output (preferably after digitization), which accurately reflects or is usable to accurately determine the physical/chemical input signal. This quantity will be the "challenge", and a range of challenges are generated, e.g., by ramping the physical/chemical input being measured by the sensors. As in the arrangement of FIG. 3, the raw, analog outputs of the sensors are differenced, and the resulting difference signal (preferably after digitization) is stored as the "response". A response is stored for every challenge value, such that CRPs are generated in the enrollment data that indicate a range of sensor difference measurements (responses) for a corresponding range of input stimulus values (challenges). This data gathering process may also include different sets of CRPs that are measured and stored for various environmental conditions, such as temperature or humidity.

In the arrangement pictured in FIG. 3, responses are generated by differencing the uncalibrated output (i.e., the pre-calibrated output) of the calibrated sensor (1A) and the output of the uncalibrated sensor 1B. In other arrangements, responses are generated with the calibrated output of 1A and the uncalibrated output of sensor 1B. In other arrangements, both of these sets of responses are generated, and all response sets are stored in an enrollment database, described below. Additional response sets may be generated by differencing sensor outputs between sensor pairs (e.g., 1A and 2A, 1A and 2B, 2A and 1B, 1B and 2B) to generate multiple sets of unique fingerprints for different sensor combinations. These response sets may be useful to detect the failure of individual elements, as described more fully below. All the differencing processes described here may be performed pre- or post-digitization, and sets may be generated from the calibrated sensors 1A and 2A both pre- and post-calibration. Again, all the response data are stored in a lookup table in associated with the challenges that produced them, which is the value of the input stimulus, which is determined by the calibrated output of one or both of the calibrated sensors.

The CRPs are preferably stored as one or more look up tables in secure, non-volatile storage in communication with a programmable processor doing the sensor monitoring tasks that will be described below. In certain cases, the processor and storage (e.g., a memory) may be housed on the same device as the sensors (e.g., an autonomous vehicle). Alternatively, this process and/or the memory may be remote. The memory that stores the CRPs may be encrypted, and indeed, it may be encrypted with an encryption key generated from one or more of the response sets described above. The memory that stores the CRPs may be the same memory that stores the calibration tables for sensors 1A and 2A, or the calibration tables may be stored in a different memory. The computing device that includes the aforementioned programmable processor and the memory will be referred to below as a "server" or a "controlling server", but it may be any computing device capable of communicating with the sensors and storage, and inventive embodiments are not limited to any particular computing architecture or location of computing components. This processor may be a unitary device, or it may be a distributed device. More generally, the arrangement of FIG. 3 includes a variety of electronic sensors producing digitized electrical output signals in response to a physical or chemical input stimulus or signal (e.g., the real-world, physical phenomenon being measured). These signals are electronically communicated to a programmable processor executing instructions stored in a memory that cause the processor to process and analyze the signals according to the method steps described below and throughout this discussion of the arrangement of FIG. 3. The processor may also, in accordance with the instructions, process sensor data (e.g., by applying calibration data to calibrate it), may use the calibrated sensor data to perform other functions (e.g., navigating a vehicle), and may reconfigure the sensor system in the event of a detected sensor failure.

Returning to the enrollment procedure, it will be appreciated that process described effectively measures the device-to-device manufacturing variations of the un-calibrated sensors 1B and 2B, either alone or in combination with the variations of the calibrated sensors 1A and 2A. Data regarding these variations are stored in a look-up table of a controlling server. The methodology is similar to the one used to calibrate a sensor, but it will be appreciated that during the enrollment process, assuming that one sensor has already been calibrated, the "challenge" values can be read directly from the output of the calibrated sensor (e.g., 1A), and it is not necessary to have precise control over the reference input signal. Indeed, if one sensor has already been calibrated, in certain embodiments, the enrollment process may be conducted simply by operating the sensors in the arrangement of FIG. 3 in their intended environment under a range of conditions likely to generate input stimulus that will be representative of what the sensors will experience in actual operation in the field. In cases where the physical/chemical input signals are known reference signals, on the other hand, the calibration table for sensor 1A can be constructed and stored at the same time that the sensor pair is being enrolled. Both the calibration table for the calibrated sensor and the enrollment data (i.e., the look up table of CRPs) may be stored in the same or in different memories. It is advantageous to organize the look-up table in such a way that the CRPs of the PUF are quick to extract.

Operation of an arrangement of enrolled sensors, such as the arrangement of FIG. 3, will now be described. During normal operation in a preferred embodiment, the controlling server reads pair 1. Because sensor 1A is calibrated, the output signal "1A" measures the input stimulus, which are the challenges. Output "1B" measures the responses (e.g., the differential read of the uncalibrated 1A and 1B signals). The controlling server verifies that the responses being measured match the responses stored in the look-up table for the stimulus values on output 1A. That is to say, the server measures the output of 1A (a challenge, accurately indicating the applied input stimulus), it then queries the look up table in memory to find the previously measured response corresponding to that challenge (i.e, the differential sensor measurement generated by application of that same input stimulus during enrollment). Having retrieved the corresponding response from memory, the server compares the previously measured response to the 1B output (the contemporaneously measured response). If the two quantities match, the server concludes that the sensors are operating normally, and that sensor 1A is trustworthy and accurately measuring the input stimulus. That sensor input may then be used by the device for whatever its designed-for purpose is (e.g., navigation or the like). This sensor verification protocol may be done continuously, periodically repeated at set or random intervals, or may be done in response to some triggering event like device powerup, a rapid change in 1A sensor output, a value of another sensor that exceeds some absolute or rate of change threshold, a manual command from a user, or the like. In certain cases, the CRPs that are retrieved from storage for matching to contemporaneously measured CRPs are ones that were previously measured during the same environmental conditions as the sensor system is currently experiencing (e.g., temperature, pressure, humidity or the like).

As in the FIG. 9 example discussed above, a "match" between a current response and a previously retrieved response may be determined by calculating a Hamming distance between a previously measured response bitstream and a contemporaneous (i.e., while in operation) response bitstream, and if the Hamming distance is below a predetermined threshold, a match is determined. Generally, a match is determined if the previously measured and contemporaneously measured response bitstreams are similar to one another to some predetermined degree, which similarity may include identity.

As will now be described, the arrangement of FIG. 3 is particularly well suited for detecting and managing the failure of one or more sensors by reconfiguration of the connections shown in FIG. 3, which are reconfigurable. In the event that the CRPs do not match (i.e., a previously measured response does not match a contemporaneously measured response for a given challenge), a sensor failure is assumed. When this occurs on the first sensor pair, the system switches to sensor pair 2, and sensor data in signal output 1A is ignored or no longer used, and whatever processing functions were using that data as input are switched to use output 2A. The CRP monitoring protocol described immediately above is also now switched to pair 2, i.e., output signal 2B is periodically compared to previously stored responses for pair 2 for the same challenges. If another mismatch is detected, meaning that pair 2 also fails, a recovery cycle may be implemented, as described below in reference to FIG. 4.

Thus far, CRP matching for sensor monitoring has been described in a sequential manner, where a first sensor pair is monitored until failure, then a second pair is monitored. This is not a requirement. To further enhance resilience, both pairs can be constantly monitored in normal operations. In the event that failure is detected in a pair not being used for operation, that pair can be taken offline, and an alert message sent to a system user or administrator. Such alert messages may also be sent whenever any failure occurs. Additionally, or alternatively, a system may engage in a recovery cycle if a non-operational sensor experiences a failure. In addition to checking if both CRPs are matching within pairs, the controlling server can also verify that the two calibrated sensors are also matching. In preferred arrangements, comparing calibrated sensor outputs (1A and 2A) is done more frequently than CRP matching, and a mismatch of calibrated sensor outputs immediately triggers the system to do CRP matching on each sensor to detect which one is faulty.

Since PUFs are unique and unclonable, the architecture described in FIG. 3 can also protect the system against cyberattacks such as fault injection, which is detectable by the protocol just described. Additionally, the PUF responses and other output signals can be encrypted at the device level. Rather than communicating the raw signals, the A/D convertors can encrypt these signals with protocols established upfront between the device and the controlling server.

The arrangement and protocol just described has considerable advantages in comparison to the use of multiple, redundant calibrated sensors. The costs of manufacturing sensors are negatively impacted by the cost of calibration, so minimizing the number of calibrated sensors is an advantage. The calibration control circuitry is often complex, necessitating non-volatile memories, and real time computing capabilities. Typically, the sensor elements and the surrounding circuits are integrated in a monolithic device. The cost of the chip is proportional to the surface area. Only 5 to 25% of the surface area of the device is the sensing element. Un-calibrated sensors take up little surface area and have a negligible impact on total costs. The cost of manufacturing of the two pairs is equivalent to 2.1 to 2.5 sensors, while the system resilience is equivalent or higher than the one delivered by 4 redundant calibrated sensors.

It will be appreciated that detecting a sensor failure simply by detecting a mismatch in CRPs within a sensor pair does not, without more, provide any information about which sensor failed. That is to say, detecting a mismatch between contemporaneously measured differenced responses by 1A and 1B with previously measured differenced responses for those same sensors does not, by itself, tell the observer whether sensor 1A failed, or whether sensor 1B failed. Additional information collected under the arrangement of FIG. 3 can reveal this information, however, particularly where CRPs have been included in the lookup table across all pairs of sensors in the arrangement. In a first case, when a CRP mismatch is detected in pair 1, the system compares the output 1A to output 2A (i.e., the calibrated sensor outputs). If these outputs match, the system knows that the failure occurred in sensor 1B, and that 1A is still functioning, and may still be used. Several steps can now be taken. First, the system can switch to pair 2 (if its CRP pairs match), and use sensor 2A and ignore 1A. Alternatively, the system can continue to use 1A, but it will not be able to reliably apply the previous CRP pairs to confirm continued good operation. In another case, the system can reconfigure connections to route the uncalibrated output from 1A to pair 2's differencing circuit such that it is differenced with 2B's output. Where CRPs were built for this sensor combination enrollment, these CRPs are then retrieved and checked against the output of pair 2's differencing circuit (1A-2B) to ensure continued operation of 1A. Thus, various sensor outputs shown in FIG. 3 may be compared in various ways to isolate a failure, and the arrangement can be reconfigured, and different outputs used, in response to various failure modes. Indeed, the pairwise use of only 2 calibrated and 2 uncalibrated sensors, as shown in FIG. 3, is capable of handling two sensor failures, even if the sensors that fail are uncalibrated. Various two sensor failure modes, and reconfiguration steps taken by certain embodiments in response are illustrated in FIG. 4, and are described below.

Case 1: Sensors 1A and 1B are failing concurrently. The controlling server detects the problem because the CRPs of pair 1 are not matching anymore. Additionally, the system detects that both 1A and 1B are failing because the calibrated signal from 1A no longer matches the calibrated signal from 2A. The system may then check to verify that pair 2 is still functional by checking the 2A-2B CRPs. If they are still matching, the second pair (2) replaces the first pair.

Case 2: Sensors 1A and 2B are failing concurrently. The controlling server detects a problem because the CRPs of both pairs are not matching. The system may then cross check 1A-2B CRPs and 2A-1B CRPs, which were previously enrolled. If the 1A-2B CRPs do not match the enrollment CRPs, but the 2A-1B CRPs do match the enrollment CRPs, 2A and 1B are functioning properly. In this case, the pair 2A/1B replaces the first pair.

Case 3: Sensors 1A and 2A are failing concurrently. The controlling server detects a problem because the CRPs of both pairs are not matching, and if both 1A and 2A are failing, they are unlikely to match each other. The controlling server can compute the CRP matching between the two sensors 1B and 2B with the look-up table, and conclude that those devices are still good. In the event that one of those devices has been calibrated, the system can then switch to that device and use the other device as a reference.

Case 4: Sensors 1B and 2B are failing concurrently. The controlling server detects a problem because the CRPs of both pairs are not matching, but the calibrated outputs 1A and 2A still match. The controlling server can observe the matching between sensors 1A and 1B, thereby knows the value of the calibrated input signal. In the event that CRPs were built between 1A and 2A during enrollment, those CRPs can be used to ensure further operation of that sensor pair, with one sensor being used as the calibrated data sensor, and other as the reference. Like other arrangements discussed here, this requires rerouting of the sensor outputs between differencing circuits.

Case 5: Sensors 1B and 2A are failing concurrently. The controlling server detects a problem because the CRPs of both pairs are not matching, and 1A and 2A also do not match. The controlling server can verify the CRP matching between sensors 1A and 2B. If positive, the pair 1A/2B replaces the first pair.

Case 6: Sensor 2A and 2B are failing concurrently. The controlling server keeps testing the CRP matching between sensors 1A and 1B. If positive, the system keeps using the pair of differential sensors 1A/1B.

As is set forth above, the architecture of FIG. 3 and failure analysis and response protocol of FIG. 4 result in a system that is as resilient as a system with 4 redundant calibrated sensors, but which uses only two calibrated sensors and two uncalibrated sensors. In many cases, however, the inventive architecture and methods provide even greater resilience. For example, when the two pairs are positioned in different locations of the system, case 1 and case 6 (where defects or damage is limited to one pair) is the most likely failure case. In such cases, switching to the other pair is easy and quick. Additionally, in all cases, the differential architecture can offer higher levels of protection against cyber-attacks and fault injection.

Figure 5:
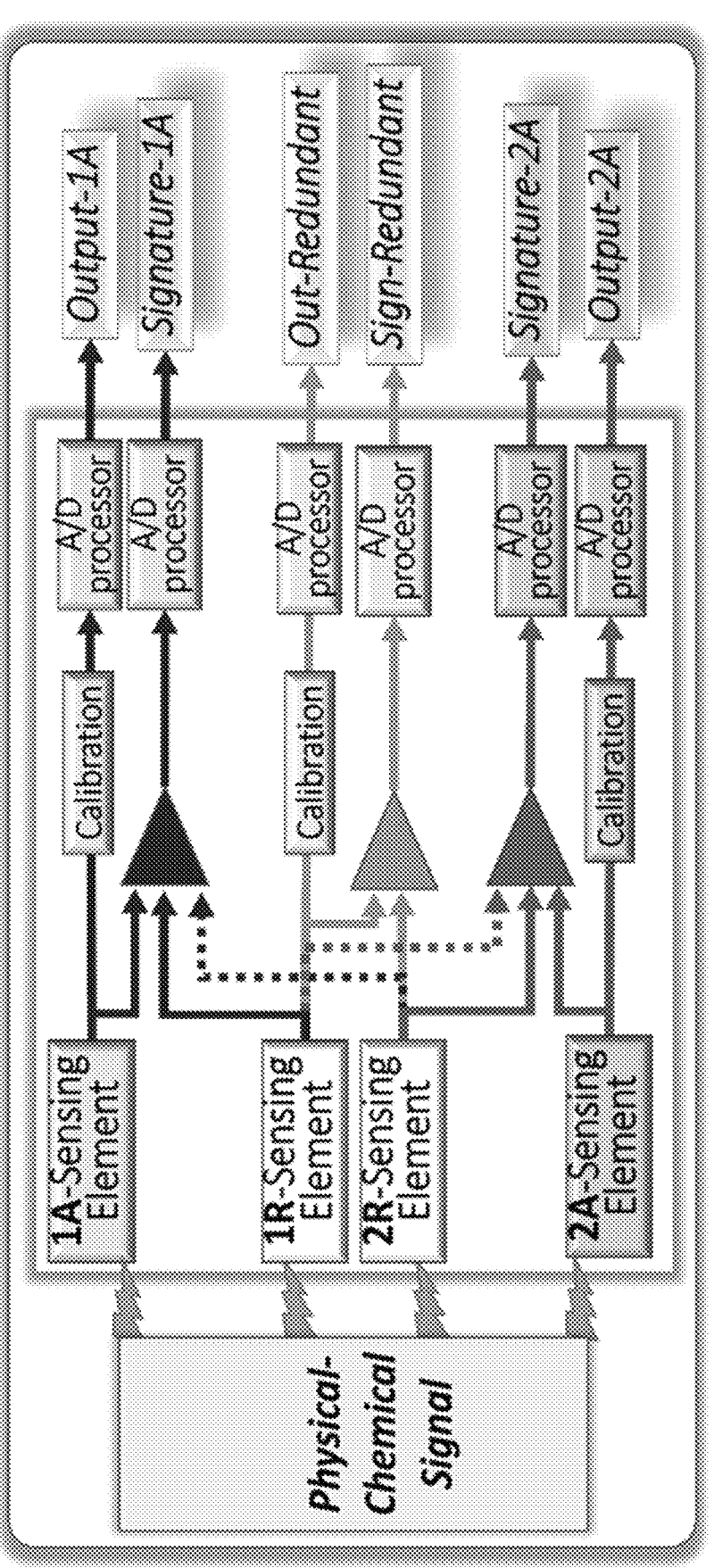
FIG. 5 is a block diagram that schematically illustrates an alternative differential sensor arrangement having a calibrated, redundant sensor element.

FIG. 5 is a block diagram showing an alternative differential sensor architecture having a redundant element. This architecture is similar to the architecture shown in FIG. 3. However, the FIG. 5 architecture includes a third calibrated sensor 1R, which acts as a reference element in combination with calibrated sensors 1A and 2A. In the FIG. 5 embodiment, during enrollment, CRPs are measured and stored for various sensor combinations. The challenges for these CRPs are values of the input stimulus, which is equivalent to the calibrated output 1A, which is the same as the calibrated output 2A and calibrated output Out-Redundant. Several different sets of responses are used to build the CRPs, and preferably, CRPs are built during enrollment between all pairs of sensors present in FIG. 5. This includes, at least, a first set of responses from the differential raw output of 1A and 1R, a second set is built from 2R and 1A, and a third set is built from 1R and 2R, a fourth set for 2A and 2R, and a fifth set for 2A-1R. During operation, differential measurements can be taken between the various uncalibrated sensor outputs by supplying those outputs in various ways to differencing circuits, as shown.

Building a comprehensive set of CRPs in this matter permits easy and precise isolation of failing sensors, as well as more flexibility in how to reconfigure the architecture to maintain resiliency while taking failed devices offline. A rule set for failure detection and reconfiguration is below. This method is implemented from a starting condition where the active sensor is 1A, producing calibrated output 1A, and sensor trust is being monitored by comparing responses generated by the differential output of 1A and 1R:

If the sensing pair 1 (1A/1R) is failing, test pair 2 (2A/2R). If CRPs on pair 2 match enrollment CRPs, use output 2A.

If the sensing pair 2 (2A/2R) is failing, test redundant pair (1R/2R). If CRPs on redundant pair match enrollment CRPs use 1R's output, Out-Redundant.

If the redundant pair (1R/2R) is failing, test pair (1A/2R).

If pair 1 (1A/2R) is failing, test pair (2A/1R).

If pair (2A/1R) is failing, test if 1st and 2nd sensing elements are coherent (1A/2B).

In practice, the architecture of FIG. 5 can more easily pinpoint a failing sensor within a sensor pair because there are two other calibrated sensor outputs available against which a failing calibrated sensor output can be checked. The architecture of FIG. 5 can tolerate 2 bad sensors out of 4, like the architecture of FIG. 3.

Figure 6:
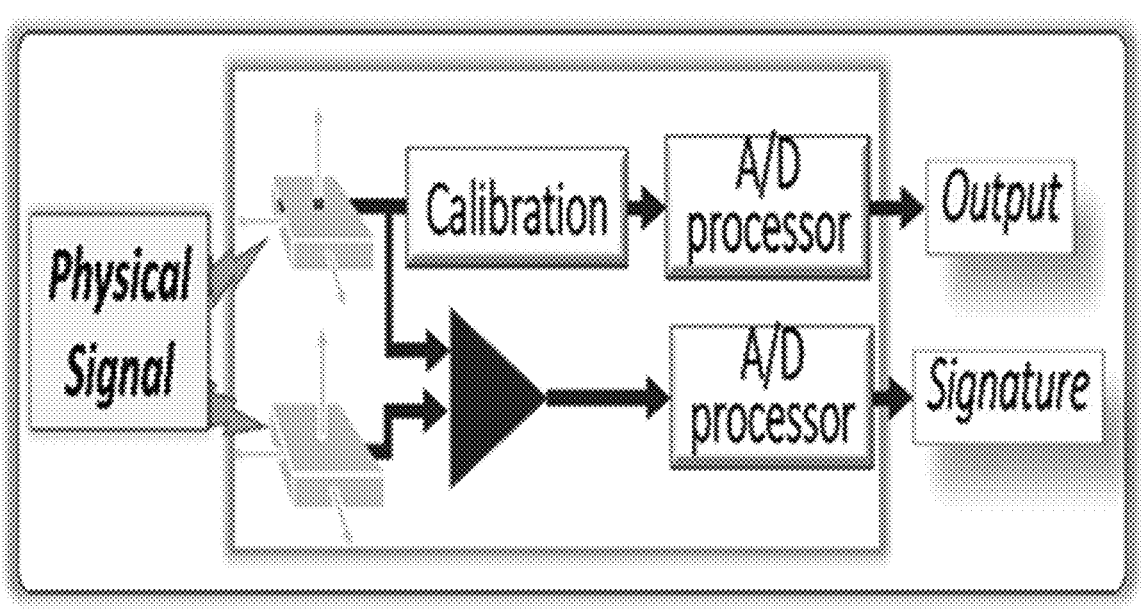
FIG. 6 is a top-and-bottom comparison of a sensor pair and an arrangement having a single sensor using differential outputs.
Figure 6:
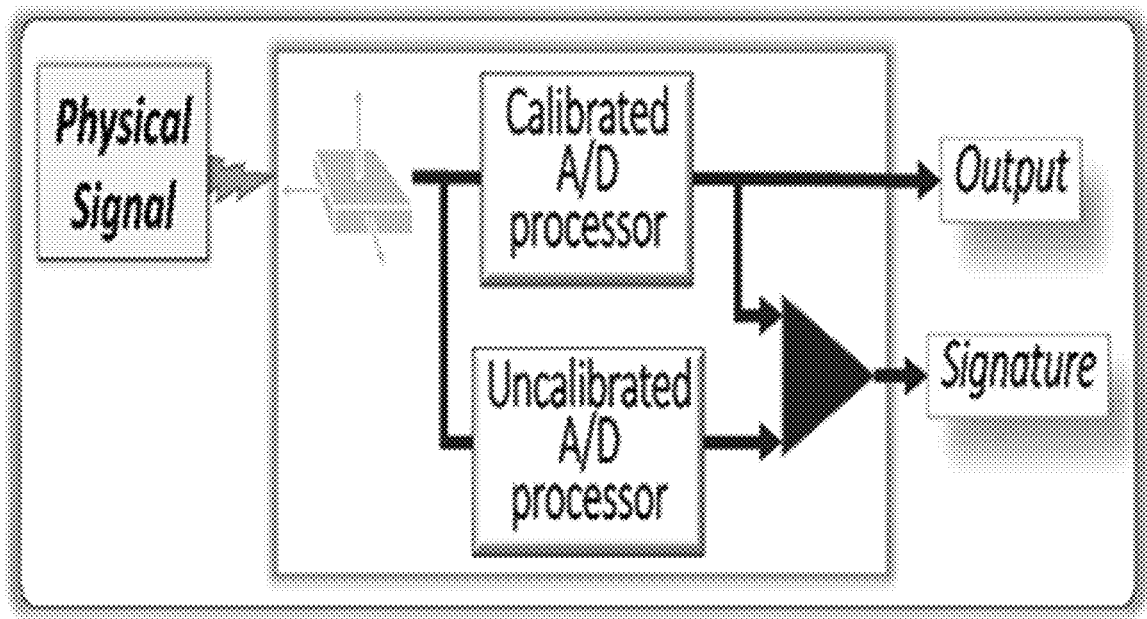

Thus far, building databases of PUF responses from differential uncalibrated sensor output has been discussed. In alternative embodiments a single sensing element having a differential sensor output may be used instead of a pair of sensors, as in the FIG. 3 architecture. A top-and-bottom comparison between the two sensor architecture of FIG. 3 (top) and an alternative single sensor architecture (bottom) is shown in FIG. 6. In the bottom architecture of FIG. 6, rather than comparing two analog signals generated by two separate sensing elements, the comparison is performed between calibrated and uncalibrated signals prior to or after analog to digital conversion. Such a cheaper implementation is not necessary desirable for all sensors, however, both schemes are good enough to detect most failure mechanisms, and cyber-attacks.

In the bottom architecture of FIG. 6, responses are generated and stored during an enrollment process, as in the FIG. 3 architecture. Here, there responses are the differencing of the calibrated and uncalibrated outputs of a single sensor, prior to analog to digital conversion. These are stored as CRPs in a secure database, as in the embodiments described above. During operation, contemporaneously measured responses (the contemporaneously measured differenced calibrated and uncalibrated outputs of the sensor) are compared to previously measured responses, periodically, for a challenge value. As in the embodiments above, the challenge value is the input stimulus, which is the calibrated output of the sensor. When a mismatch (where a match may be determined by a Hamming distance between a current and a previously measured response below some threshold) is detected, the sensor is declared to be compromised.

Figure 7:
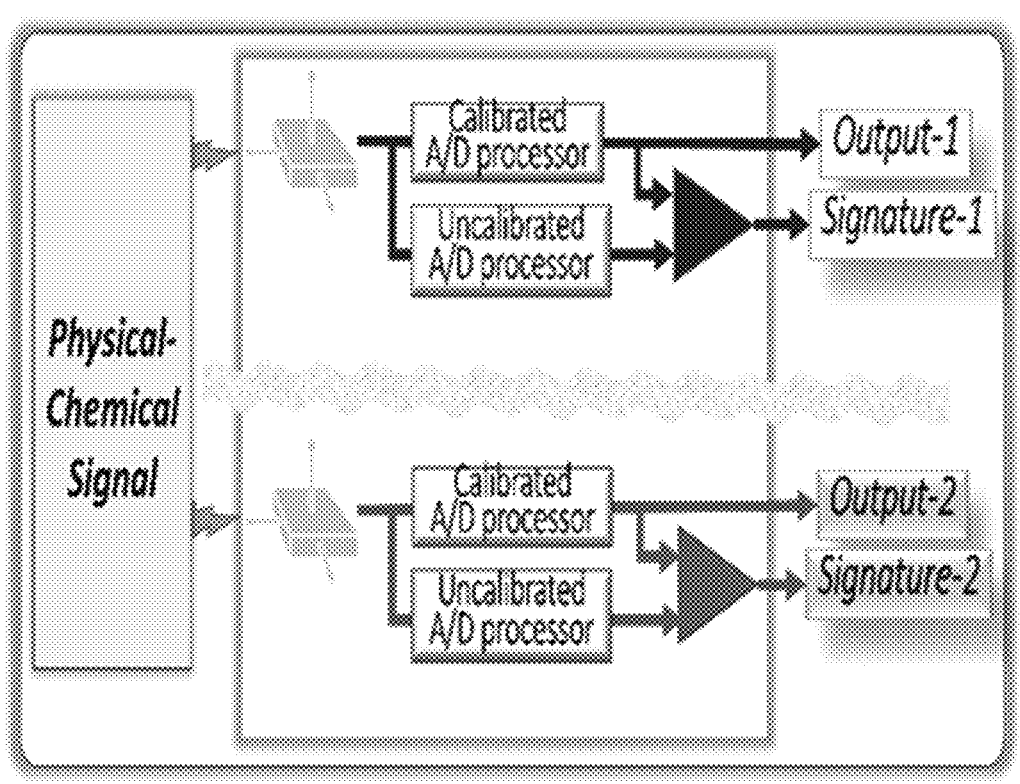
FIG. 7 schematically illustrates two sensor embodiments having multiple single sensor subsystems.
Figure 7:
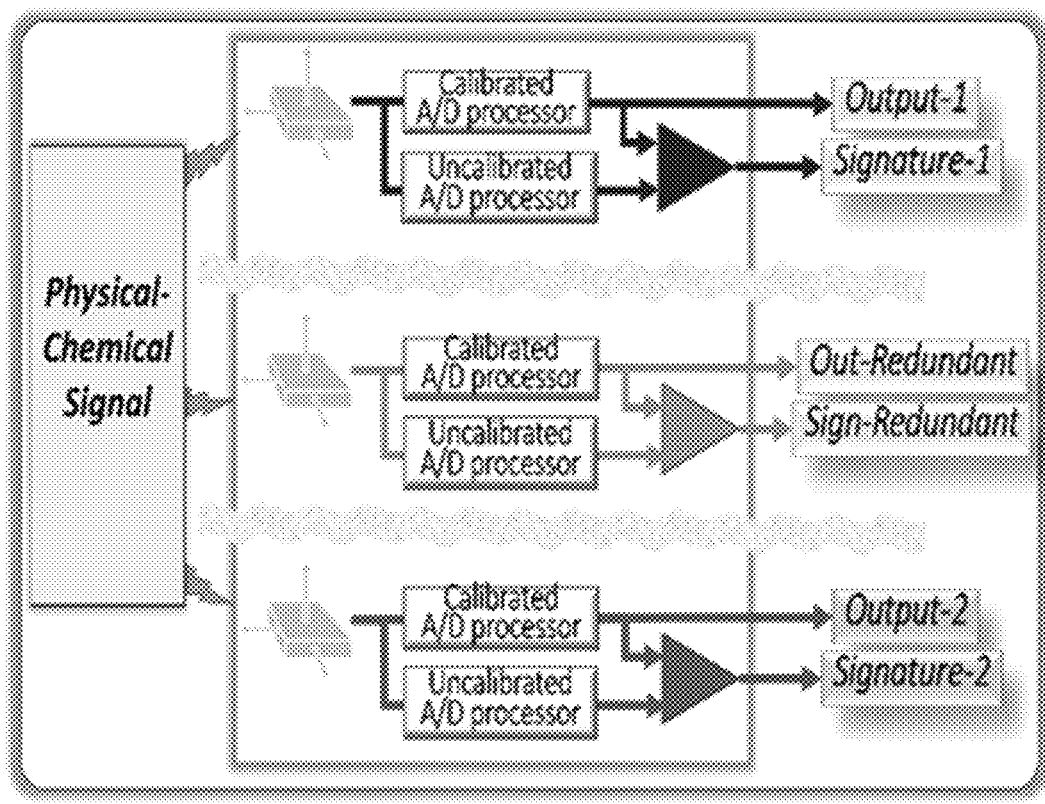

In certain cases, where a sensor is determined to be compromised, the system switches to a new calibrated sensor for use. An architecture with 2 single sensor subsystems is illustrated in FIG. 7 (top) and an alternative system with three single sensor sub-systems, one of which acts as a redundant system (bottom). As in the embodiments described above, the sensor subsystems are preferably physically separated on whatever device is using the sensor output. FIG. 7 illustrates how a sensor with single sensing elements with differential outputs is scalable for redundant configuration. In the embodiment on the top of FIG. 8, which uses two sensor elements, the system can accommodate a single sensor failure. [How is this better than just two calibrated sensors, one of which is redundant?] In order to overcome more than one sensor failure, three single sensor systems as in the bottom of FIG. 7 can be used.

Figure 8:
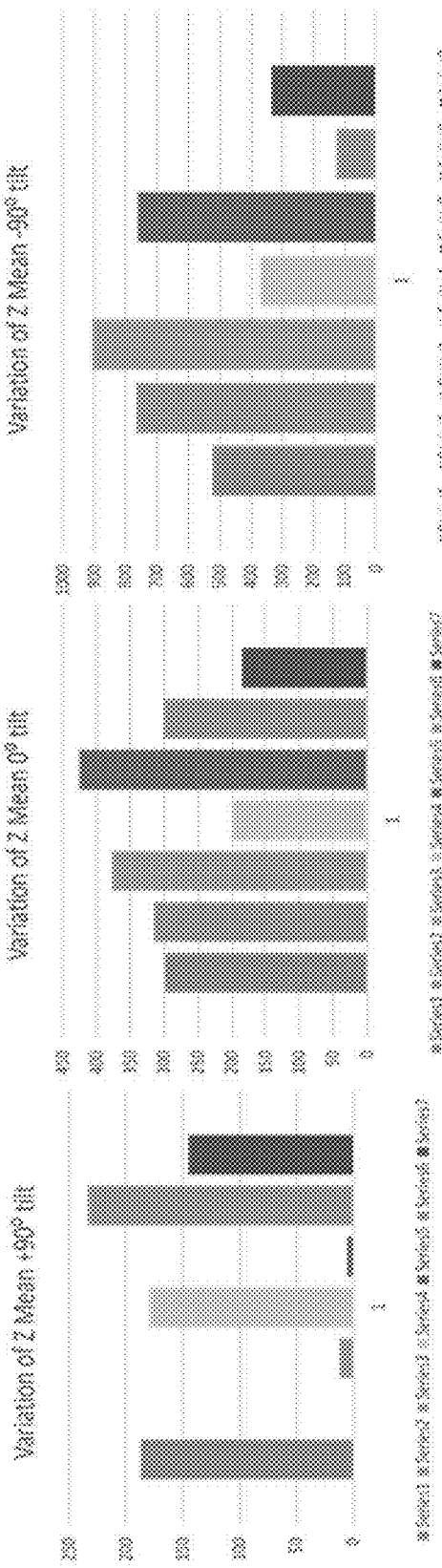
FIG. 8 presents data regarding the response variations of certain sensors making them suitable for use as PUFs to enhance the security of sensors against malicious attacks.

FIG. 8 is an analysis of 7 commercial accelerometers, the outputs of which were measured differentially with a reference sensor. The sensitivity of the sensor is 5 volt/g (g is the gravitational acceleration). A digital reading of "1000" in the Y-axis in FIG. 8 corresponds to a difference in acceleration measurement of 0.05 g. Not only is the sensor-to-sensor variation random, but the randomness varies as a function of the tilt. For example, the knowledge of the variation at +90 deg. tilt cannot be used to anticipate the variation at 0 deg, which is desirable for the overall resilience of the system and its cybersecurity. A 9-axis sensor commonly used on many terminal devices has 3-axis for acceleration, 3-axis for rotation, and 3-axis to sense the magnetic field. Four of these sensors, two calibrated, two non-calibrated, connected together as described in this disclosure, can offer considerable protection.

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A system comprising:
a signal source that produces a detectable physical or chemical signal;
a sensor system comprising:
a sensor pair comprising:
a first sensor that converts the detectable signal into an uncalibrated analog electrical first sensor output signal;
a second sensor that converts the detectable signal into an uncalibrated analog electrical second sensor output signal;
a differencing circuit that produces a difference output reflecting a difference between the uncalibrated analog electrical first sensor output signal and the uncalibrated analog electrical second sensor output signal,
a challenge-response-pair database including a record of previously measured difference outputs generated by the difference circuit from previously measured uncalibrated outputs of the first and second sensors, each previously measured difference output being stored in association with a previously measured calibrated first sensor data, and
a programmable processor configured to:
access a calibration table and to apply calibration data to the uncalibrated analog electrical first sensor output signal to produce a calibrated signal that accurately reflects the detectable physical or chemical signal;
access the challenge-response-pair database and retrieve a previously measured difference output associated with a previously measured calibrated first sensor data that matches calibrated signal;
compare the retrieved previously measured difference output with a contemporaneously measured difference output to determine whether the difference outputs match, and
if the difference outputs do not match, discontinue use of the calibrated signal.

2. The system of claim 1, further comprising one or more analog-to-digital converters configured to produce a digital output of the calibrated signal and a digital output of the differencing circuit.

3. The system of claim 1, wherein comparing the retrieved previously measured difference output with a contemporaneously measured difference output to determine whether the difference outputs match comprises computing a Hamming distance between digital signals reflecting the previously measured difference output of the differencing circuit and the contemporaneously measured difference output of the differencing circuit.

4. The system of claim 3, wherein determining a match comprises determining a match if the Hamming distance between digital signals reflecting the previously measured difference outputs of the differencing circuit and the contemporaneously measured difference outputs of the differencing circuit is below a predetermined threshold.

5. The system of claim 1, wherein the processor is further configured to, if the difference outputs do not match, begin use of an output sensor from a sensor other than the first sensor.

6. A system comprising:
a signal source that produces a detectable physical or chemical signal;
a sensor system comprising:
a first sensor pair comprising:
a first sensor that converts the detectable signal into an uncalibrated analog electrical first sensor output signal;
a second sensor that converts the detectable signal into an uncalibrated analog electrical second sensor output signal;
a first differencing circuit that produces a difference output reflecting a difference between the uncalibrated analog electrical first sensor output signal and the uncalibrated analog electrical second sensor output signal;
a second sensor pair comprising:
a third sensor that converts the detectable signal into an uncalibrated analog electrical third sensor output signal;
a fourth sensor that converts the detectable signal into an uncalibrated analog electrical fourth sensor output signal;
a second differencing circuit that produces a difference output reflecting a difference between the uncalibrated analog electrical third sensor output signal and the uncalibrated analog electrical fourth sensor output signal, and
a programmable processor configured to:
access a calibration table and to apply calibration data to the uncalibrated analog electrical first sensor output signal to produce a first calibrated signal that accurately reflects the detectable physical or chemical signal;
access the calibration table and to apply calibration data to the uncalibrated analog electrical third sensor output signal to produce a second calibrated signal that accurately reflects the detectable physical or chemical signal;
access a challenge-response-pair database stored in a memory, the challenge-response-pair database including a record of previously measured difference outputs generated by the first differencing circuit, the memory further configured to compare previously measured difference outputs of the first differencing circuit with contemporaneously measured difference outputs of the first differencing circuit, and on the basis of the comparison, determine a match;
discontinue use of the first calibrated signal if the previously measured difference outputs of the differencing circuit do not match contemporaneously measured difference outputs of the first differencing circuit and
begin use of the second calibrated signal.

7. A method of sensing a detectable physical or chemical signal, comprising:
with a first sensor, converting the detectable signal into an uncalibrated analog electrical first sensor signal;
with a second sensor, converting the detectable signal into an uncalibrated analog electrical second sensor signal;
applying calibration data to the uncalibrated analog electrical first sensor signal to produce a calibrated output signal that accurately reflects the detectable physical or chemical signal, and computing a difference between the uncalibrated analog electrical first sensor signal and the uncalibrated analog electrical second sensor signal, comparing previously measured differences between the uncalibrated analog electrical first sensor signal and the uncalibrated analog electrical second sensor signal with contemporaneously measured differences between the uncalibrated analog electrical first sensor signal and the uncalibrated analog electrical second sensor signal for the same detectable signals, and on the basis of the comparison, determining a match;

directing a system to discontinue use of the calibrated output signal if the previously measured differences between the uncalibrated analog electrical first sensor signal and the uncalibrated analog electrical second sensor signal with contemporaneously measured differences between the uncalibrated analog electrical first sensor signal and the uncalibrated analog electrical second sensor signal do not match for the same detectable signal.

8. The method of claim 7, further comprising digitizing the calibrated output signal and the difference between the uncalibrated analog electrical first sensor signal and the uncalibrated analog electrical second sensor signal.

9. The method of claim 7, wherein comparing previously measured differences between the uncalibrated analog electrical first sensor signal and the uncalibrated analog electrical second sensor signal with contemporaneously measured differences between the uncalibrated analog electrical first sensor signal and the uncalibrated analog electrical second sensor signal for the same detectable signals comprises accessing a challenge-response-pair database stored in a memory, the challenge-response-pair database including a record of previously measured differences between the uncalibrated analog electrical first sensor signal and the uncalibrated analog electrical second sensor signal.

10. The method of claim 7, wherein determining a match comprises computing a Hamming distance between digital signals reflecting the previously measured previously measured differences between the uncalibrated analog electrical first sensor signal and the uncalibrated analog electrical second sensor signal with a digital signal reflecting contemporaneously measured differences between the uncalibrated analog electrical first sensor signal and the uncalibrated analog electrical second sensor signal for the same detectable signals.

11. The method of claim 10, wherein determining a match comprises determining a match if the Hamming distance is below a predetermined threshold.

12. The method of claim 7, further comprising directing a system to use a third calibrated sensor in the event of no match.

\* \* \* \* \*